(12) United States Patent
Eaton et al.

(10) Patent No.: US 8,200,011 B2
(45) Date of Patent: Jun. 12, 2012

(54) CONTEXT PROCESSOR FOR VIDEO ANALYSIS SYSTEM

(75) Inventors: John Eric Eaton, Houston, TX (US); Wesley Kenneth Cobb, Woodlands, TX (US); Bobby Ernest Blythe, Houston, TX (US); Rajkiran Kumar Gottumukkal, Houston, TX (US); Kishor Adinath Saitwal, Houston, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 1017 days.

(21) Appl. No.: 12/112,864

(22) Filed: Apr. 30, 2008

(65) Prior Publication Data

US 2009/0087024 A1 Apr. 2, 2009

Related U.S. Application Data

(60) Provisional application No. 60/975,563, filed on Sep. 27, 2007.

(51) Int. Cl.
G06K 9/00 (2006.01)
G06K 9/34 (2006.01)

(52) U.S. Cl. ........................................ 382/173; 382/103

(58) Field of Classification Search ........................ None
See application file for complete search history.

(56) References Cited

U.S. PATENT DOCUMENTS

| | | | |
|---|---|---|---|
| 4,679,077 A | 7/1987 | Yuasa et al. | |
| 5,113,507 A | 5/1992 | Jaeckel | |
| 5,748,775 A | 5/1998 | Tsuchikawa et al. | |
| 5,751,378 A | 5/1998 | Chen et al. | |
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 * | 5/2003 | Tserng | 348/143 |
| 6,603,474 B1 * | 8/2003 | Cobb et al. | 345/421 |
| 6,661,918 B1 | 12/2003 | Gordon et al. | |
| 6,674,877 B1 * | 1/2004 | Jojic et al. | 382/103 |
| 6,678,413 B1 | 1/2004 | Liang et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,136,525 B1 | 11/2006 | Toyama et al. | |

(Continued)

FOREIGN PATENT DOCUMENTS

WO 2009049314 A2 4/2009

OTHER PUBLICATIONS

Zhou et al. "A background layer model for object tracking through occlusion", IEEE ICCV 2003.*

(Continued)

*Primary Examiner* — Li Liu
(74) *Attorney, Agent, or Firm* — Patterson & Sheridan, LLP

(57) ABSTRACT

Embodiments of the present invention provide a method and a system for mapping a scene depicted in an acquired stream of video frames that may be used by a machine-learning behavior-recognition system. A background image of the scene is segmented into plurality of regions representing various objects of the background image. Statistically similar regions may be merged and associated. The regions are analyzed to determine their z-depth order in relation to a video capturing device providing the stream of the video frames and other regions, using occlusions between the regions and data about foreground objects in the scene. An annotated map describing the identified regions and their properties is created and updated.

24 Claims, 5 Drawing Sheets

U.S. PATENT DOCUMENTS

| | | | |
|---|---|---|---|
| 7,158,680 B2 | 1/2007 | Pace | |
| 7,200,266 B2 | 4/2007 | Ozer et al. | |
| 7,227,893 B1 * | 6/2007 | Srinivasa et al. | 375/240.08 |
| 7,372,977 B2 * | 5/2008 | Fujimura et al. | 382/103 |
| 7,436,887 B2 * | 10/2008 | Yeredor et al. | 375/240.01 |
| 7,825,954 B2 * | 11/2010 | Zhang et al. | 348/169 |
| 7,868,912 B2 | 1/2011 | Venetianer et al. | |
| 2003/0107650 A1 | 6/2003 | Colmenarez et al. | |
| 2004/0151342 A1 * | 8/2004 | Venetianer et al. | 382/103 |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0165386 A1 | 7/2006 | Garoutte | |
| 2006/0190419 A1 | 8/2006 | Bunn et al. | |
| 2006/0222206 A1 | 10/2006 | Garoutte | |
| 2008/0002856 A1 | 1/2008 | Ma et al. | |
| 2008/0166045 A1 * | 7/2008 | Xu et al. | 382/170 |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 * | 10/2008 | Senior | 382/103 |
| 2008/0252723 A1 * | 10/2008 | Park | 348/143 |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0297023 A1 * | 12/2009 | Lipton et al. | 382/164 |
| 2009/0324107 A1 | 12/2009 | Walch | |
| 2010/0063949 A1 | 3/2010 | Eaton et al. | |

OTHER PUBLICATIONS

ETISEO Video Understanding Evaluation project, May 2006.*

Greenhill et al. "Occlusion analysis: Learning and utilising depth maps in object tracking", Image and Vision Computing, 2007.*

Hoogs et al. "Video content annotation using visual analysis and a large semantic knowledgebase", IEEE CVPR 2003.*

Benjamin Yao et al. "Introduction to a large-scale general purpose ground truth database: methodology, annotation tool and benchmarks", EMMCVPR 2007.*

S. Apewokin, et al. "Multimodal Mean Adaptive Backgrounding for Embedded Real-Time Video Surveillance," (2007) IEEE 6 pages.

Ismail Haritaoglu, et al. "W4: Real-Time Surveillance of People and Their Activities," IEEE Transactions on Pattern Analysis and Machine Intelligence, vol. 22, No. 8 (Aug. 2000), pp. 809-830.

Pentti Kanerva, "Sparse Distributed Memory and Related Models," M.H. Hassoun, ed., Associative Neural Memories: Theory and Implementation, pp. 50-76. New York: Oxford University Press (1993).

Richard Nock, et al. "Statistical Region Merging," IEEE Transactions on Patter Analysis and Machine Intelligence, vol. 26, No. 11 (Nov. 2004) pp. 1452-1458.

J. Connell et al., "Detection and Tracking in the IBM PeopleVision System," IEEE ICME, Jun. 2004: pp. 1-4, <http://www.research.ibm.com/peoplevision>.

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Elgammal et al. "Non-parametric Model for Background Substraction," Computer Vision Laboratory, University of Maryland; Jun. 2000; 17 pages, College Park, MD US.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

* cited by examiner

CONTEXT PROCESSOR FOR VIDEO ANALYSIS SYSTEM

CROSS REFERENCE TO RELATED APPLICATION

This application claims benefit of U.S. Provisional Patent Application Ser. No. 60/975,563 filed Sep. 27, 2007. This application relates to commonly assigned, co-pending U.S. patent application Ser. No. 12/028,484 filed Feb. 8, 2008, entitled "Behavioral Recognition System", which are both herein incorporated by reference in their entirety.

BACKGROUND OF THE INVENTION

1. Field of the Invention

Embodiments of the present invention generally relate to analyzing recorded video, and more particularly to analyzing a stream of video frames to generate contextual information regarding a scene depicted in the video frames.

2. Description of the Related Art

Some currently available video analysis systems include video content analysis capabilities. Such systems may be configured to analyze streams of video frames, whether recorded or in real-time, to detect abnormal behaviors or suspicious activities. However, many such analysis systems lack efficiency in processing video content. For example, while the importance of isolating background and foreground images has been acknowledged, many of the video analysis systems fail in implementation. Furthermore, they fail to detect, track, and label objects within the scene in a quick and effective manner, particularly when an object of interest becomes occluded by other objects. Maintaining these types of information over time has also been a challenge.

SUMMARY OF THE INVENTION

Embodiments of the present invention provide a method and a system for mapping a scene depicted in an acquired stream of video frames that may be used by a machine-learning behavior-recognition system. A background image of the scene is segmented into plurality of regions representing various objects of the background image. Statistically similar regions may be associated and merged. The regions are analyzed to determine their z-depth order in relation to a video capturing device providing the stream of the video frames and other regions using occlusions between the regions and data about foreground objects in the scene. An annotated map describing the identified regions and their properties is created and updated.

One embodiment of the invention includes a method for mapping a scene depicted in a sequence of video frames. The method may generally include generating, from the sequence of video frames, a background image representing static elements in the scene, receiving a current video frame; and identifying a plurality of regions of the current frame depicting the background image. The method may further include analyzing the plurality of regions of the current frame to identify at least a first region that occludes at least a portion of a second region and updating an annotated map of the scene to indicate that the first region is in front of the second region, relative to a position of a camera capturing the sequence of video frames.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
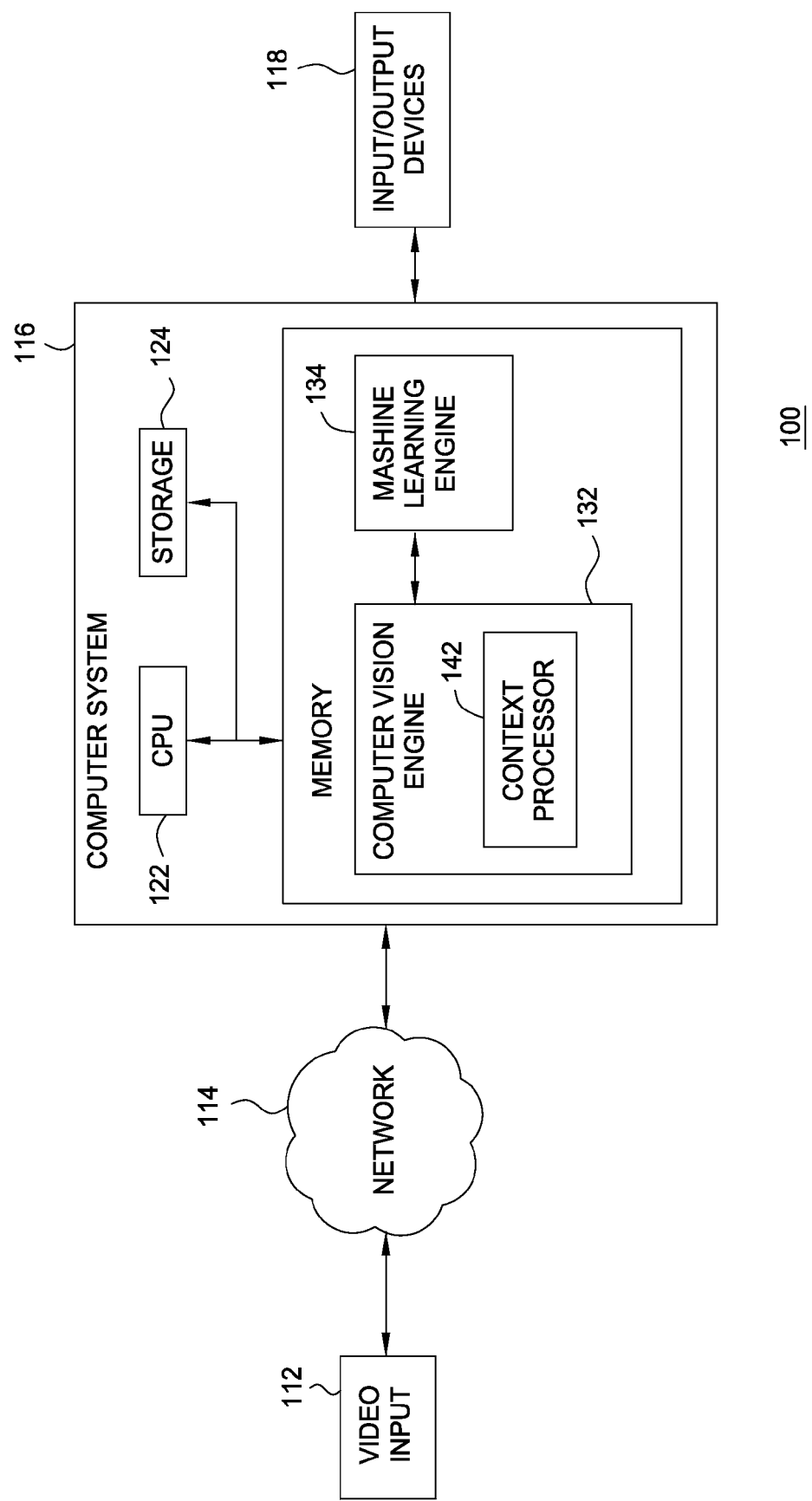
FIG. 1 is a block diagram illustrating components of a video analysis system, according to one embodiment of the present invention.

Machine-learning behavior-recognition systems learn behaviors based on information acquired from observations made of an environment made over time. In context of the present invention, information from a video stream (i.e., a sequence of individual video frames) is analyzed. In particular, this disclosure describes a method and a system for performing a contextual analysis of a scene depicted in the video stream. Embodiments of the invention may be used to analyze information captured in the video stream, and to identify a variety of contextual information about what is going on within the scene. In one embodiment, content of the video stream is analyzed frame-by-frame in which each frame is represented as a two-dimensional array of pixel color values.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD- ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating components of a video analysis system, according to one embodiment of the present invention. As shown, the behavior-recognition system 100 includes a video input 112, a network 114, a computer system 116, and input and output devices 118 (e.g., a monitor, a keyboard, a mouse, a printer, and the like).

The network 114 receives video data (e.g., video stream(s), video images, or the like) from the video input 112. The video input 112 may be a video camera, a VCR, DVR, DVD, computer, web-cam device, or the like. For example, the video input 112 may be a stationary video camera aimed at certain area (e.g., a subway station, a parking lot, a building entry/exit, etc.), which continuously records the area and events taking place therein. Generally, the area visible to the camera is referred to as the "scene." The video input 112 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value). Further, the video stream may be formatted using known such formats e.g., MPEG2, MJPEG, MPEG4, H.263, H.264, and the like. The behavior-recognition system 100 may be configured to analyze this raw information to identify active objects in the stream, classify such elements, derive a variety of metadata regarding the actions and interactions of such elements and supply this information to a machine learning engine. In turn, the machine learning engine may be configured to evaluate, observe, learn and remember what events transpire within the scene over time. Further, based on the "learning," the machine learning engine may identify certain behaviors as anomalous.

The network 114 may be used to transmit the video data recorded by the video input 112 to the computer system 116. In one embodiment, the network 114 transmits the received stream of video frames to the computer system 116. Illustratively, the computer system 116 includes a CPU 122, storage 124 (e.g., a disk drive, optical disk drive, floppy disk drive, and the like), memory 126 containing a computer vision engine 132, and a machine learning engine 134. The computer vision engine 132 may provide a software application configured to analyze a sequence of video frames provided by the video input 112. For example, in one embodiment, the computer vision engine 132 may be configured to analyze video frames to identify targets of interest, track those targets of interest, infer properties about the targets of interest, classify them by categories, and tag the observed data. In one embodiment, the computer vision engine 132 generates a list of attributes (such as texture, color, and the like) of the classified objects of interest and provides the list to the machine learning engine 134. Additionally, the computer vision engine may supply the machine learning engine 134 with a variety of information about each tracked object within a scene (e.g., kinematic data, depth data, color, data, appearance data, etc.).

Further, as described in greater detail below, the computer vision engine 132 may process video frame data to distinguish between background elements of the scene and foreground elements. The background image may represent a static image of the scene, absent any foreground elements. Further still, in one embodiment, the computer vision engine 132 may be configured to identify different regions, or segments, of the background image and identify contextual information about each segment, e.g., whether one segment is in front of (or behind) another segment. From this information, the computer vision engine 132 may determine dimensionality and geometry of both background and foreground elements. For example, assume a computer vision engine has identified a blob of pixels as depicting a human individual. And further, that the blob is 30 pixels in height. This provides a convenient mechanism for estimating the size of objects in the scene, based on the average height of a person.

In one embodiment, the computer engine 132 may include a context processor 142 implementing the methodologies of the present disclosure. Generally, the context processor 142 combines results received at different stages of the video stream analysis performed by the behavior-recognition system 100 and creates an annotated map of the scene. The context processor 142 segments the scene into spatially separated regions, compares region pairs to identify whether one region is in front of (or behind) another. From this information, the context processor may be able to build up z-order (depth) information regarding the scene. Further, the context processor 142 may be configured to label different regions with metadata (e.g., a determination of whether a given region is natural or man-made).

The machine learning engine 134 receives the video frames and the results generated by the computer vision engine 132. The machine learning engine 134 analyzes the received data, builds semantic representations of events depicted in the video frames, determines patterns and learns from these observed behaviors to identify normal and/or abnormal events. Data describing whether a normal/abnormal behavior/event has been determined and/or what such behavior/event is may be provided to output devices 118 to issue alerts, for example, an alert message presented on a GUI interface screen.

In general, both the computer vision engine 132 and the machine learning engine 134 process the received video data in real-time. However, time scales for processing information by the computer vision engine 132 and the machine learning engine 134 may differ. For example, in one embodiment, the computer vision engine 132 processes the received video data frame -by-frame, while the machine learning engine processes the received data every N-frames. In other words, while the computer vision engine 132 analyzes each frame in real-time to derive a set of information about what is occurring within a given frame, the machine learning engine 134 is not constrained by the real-time frame rate of the video input.

Note, however, FIG. 1 illustrates merely one possible arrangement of the behavior-recognition system 100. For example, while the video input 112 is shown connected to the computer system 116 via the network 114, the network 114 is not always present or needed (e.g., the video input 112 may be directly connected to the computer system 116). Further, various components and modules of the behavior-recognition system may be implemented into other systems. For example, in one embodiment, the computer vision engine 132 may be implemented as a part of a video input device (e.g., as a firmware component wired directly into a video camera). In such a case, the outputs of the video camera may be provided to the machine learning engine 134 for analysis.

Moreover, while the context processor 142 is depicted as a part of the computer vision engine 132, it may be implemented as a separate module placed into the memory 126. The context processor may also be implemented as a system separate from the computer system 116 or, alternatively, as a part of a different system. In such a case, the context processor 142 may communicate with other components of the behavior-recognition system 100 via, for example, network 114. Furthermore, the methodologies described in the present disclosure, including the context processor 142, may be implemented into any suitable video content analysis system to provide detailed information about particular objects in a scene.

Figure 2:
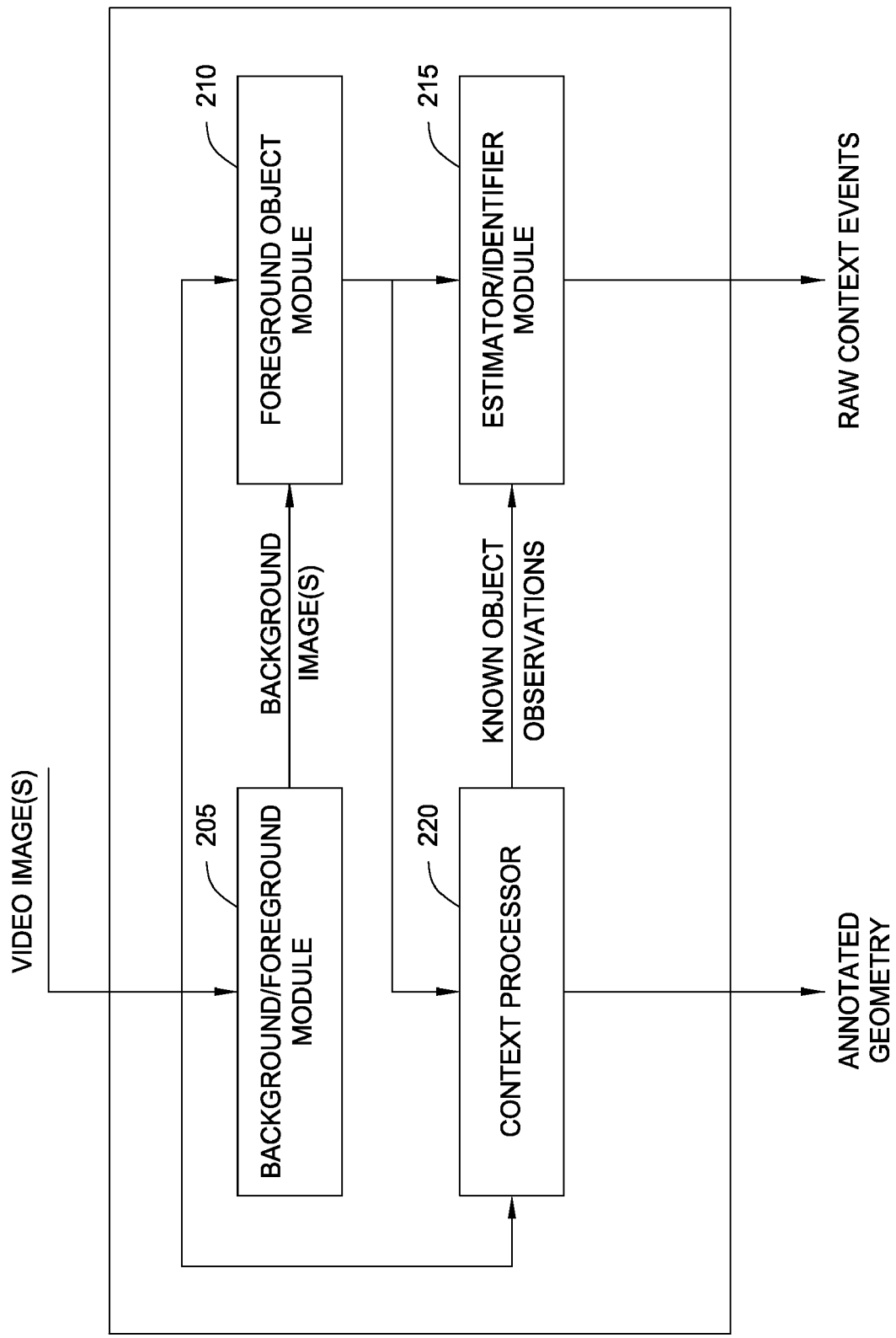
FIG. 2 illustrates a computer vision engine of a video analysis system, according to one embodiment of the present invention.

FIG. 2 illustrates a computer vision engine 200 of a video analysis system as well as functionality and information flow of the computer vision engine 200, according to one embodiment of the present invention. As shown, the computer vision engine 200 includes a background-foreground module 205, a foreground object module 210, a context processor 215 and estimator-identifier module 220.

The background-foreground module 205 may be configured to analyze video images (video frames) to identify and/or update a set of background and foreground images and/or background and foregrounds models for use by other components of the behavior-recognition system. The background-foreground module 205 uses pixel features in each video frame to identify which portions of a given frame depict part of the background image and which depict part of a foreground object.

Generally, the background image includes stationary elements of the scene being captured by the video input (e.g., pixels depicting a platform of a subway station), while the foreground image includes volatile elements captured by the video input (e.g., pixels depicting a man moving around the platform). In other words, the background image provides a stage upon which foreground elements may enter, interact with one another and leave.

Typically, pixels that do not significantly change color over time are considered part of the background image of a scene while the rest of the pixels are considered to form foreground objects of the scene. Thus, a background color for a particular pixel may be determined as an average of color values for that pixel over many frames. Motions of the foreground objects are determined based on differences between pixel color values in the successive video frames. A background image may be envisioned as a video frame of pixels having the foreground objects removed. Foreground images may be envisioned as pixels that occlude the background image or, alternatively, as a transparent video frame with patches of the foreground pixels.

Which pixels are parts of the background or foreground images may be determined for each frame in a sequence of video frames, and foreground elements may be identified by a comparing color value for a given pixel with the color value associated with a background image for that pixel. It should be noted, that while two consecutive frames may be sufficient to track a given foreground object, comparing multiple consecutive frames provides more accurate results when determining the background image for a given scene. As new frames are received, elements of the background image may be updated based on additional information included in each successive frame. Also, a pixel originally determined as a background pixel (in one frame) may become a foreground pixel (in another frame) and vice versa. For example, when the color value of a pixel changes from the background color, it may be assumed that a foreground object is now occluding the background object (i.e., the foreground object is in front of the background object). In such a case, the pixel may be re-classified as part of a foreground object for that frame, and subsequent frames, until the foreground object no longer occludes the background. Thus, when pixel returns to the background color associated with that pixel may be re-classified as being part of the background (for that frame, and for subsequent frames) until the pixel color changes again (as new elements move into the foreground, again occluding the background elements of the scene).

In one embodiment, the background-foreground module 205 provides identified foreground images(s) to the foreground object module 210. Generally, the foreground object module 210 analyzes foreground image(s) of a given frame to identify a set of blobs (i.e., a group of related pixels) by segmenting the foreground image(s) into targets of interest. In other words, the foreground object module 210 is configured to isolate distinct blobs within the foreground image(s), where each blob is likely to represents a different foreground object within the frame (e.g., a car, man, suitcase, and the like). For each foreground blob, a search model may be initialized when a foreground blob is initially identified. The search model is used to capture a position of a blob within the scene, identify which pixels are included as part of the blob, and store a variety of metadata regarding the observed behavior of the blob from frame-to-frame.

Further, the search model may be used to predict, find and track motions of a corresponding object from frame-to-frame. The foreground object module 210 may receive a detected foreground blob of a current video frame and seek a search model of a previous video frame that provides the closest match with the foreground blob. For example, for each currently detected foreground blob, the foreground object module 210 may seek a search model that a relative dimensional vectoring distance between the search model and the foreground blob is global minimum. Further, the foreground object module 210 may use kinematic information acquired based on previous video frames to estimate locations of the search model within the current video frame. Therefore, different types of information regarding the same objects are determined (e.g., kinematic characteristics of the object, orientation, direction of movement, and so on) as such an object moves through the scene. As successive frames are received, the search model is updated as the foreground blob continues to be present through successive video frames.

The estimator-identifier module 215 may be configured to attempt to classify the detected foreground blobs as being one of discrete number classifications, in other words, as a member of known class/category. For example, in one embodiment the estimator-identifier module 215 may classify a foreground object as being one of a "human," a "vehicle," an "other," or an "unknown." After classifying a foreground object, further estimations regarding such object may be made, e.g., the object's pose (e.g., orientation, posture, and the like), location (e.g., location within a scene depicted by the video images, location relative to other objects of interest, and like), and motion (e.g., trajectory, speed, direction, and the like) are estimated. The estimator-identifier module 215 may also determine static data (e.g., size, color, and the like) and kinematic data (e.g., speed, velocity, direction and the like) representative of the classified object over a period of time (e.g., X-number of frames). Such data is continuously updated as more objects of interest are classified and identified and their pose, static, kinematics data is determined and collected. For each identified object, the estimator-identifier 215 outputs raw context events containing the above-described characteristics of the object of interest and known object observations, such as static and kinematic characteristic of an average member of the class of the identified object.

As shown in FIG. 2, the context processor 220 combines results received from other components of the computer vision engine 200 (such as the background-foreground module 205, foreground object module 210, and the estimator-identifier module 215) and generates an annotated map (annotated geometry) of a scene captured in the video frames. The annotated geometry describes physical dimensions related to background/foreground objects within the scene. In one embodiment, the background image is segmented into spatially separated regions, each region being defined by a set of pixels. Region pairs may be evaluated to identify whether one region is in front of (or behind) another region, i.e., whether one region is closer (or farther) from a video capturing device. Optionally regions may be labeled with metadata describing what the region depicts (e.g., whether a region represents a natural or man-made element, structure or non-structure elements, etc.).

Figure 3:
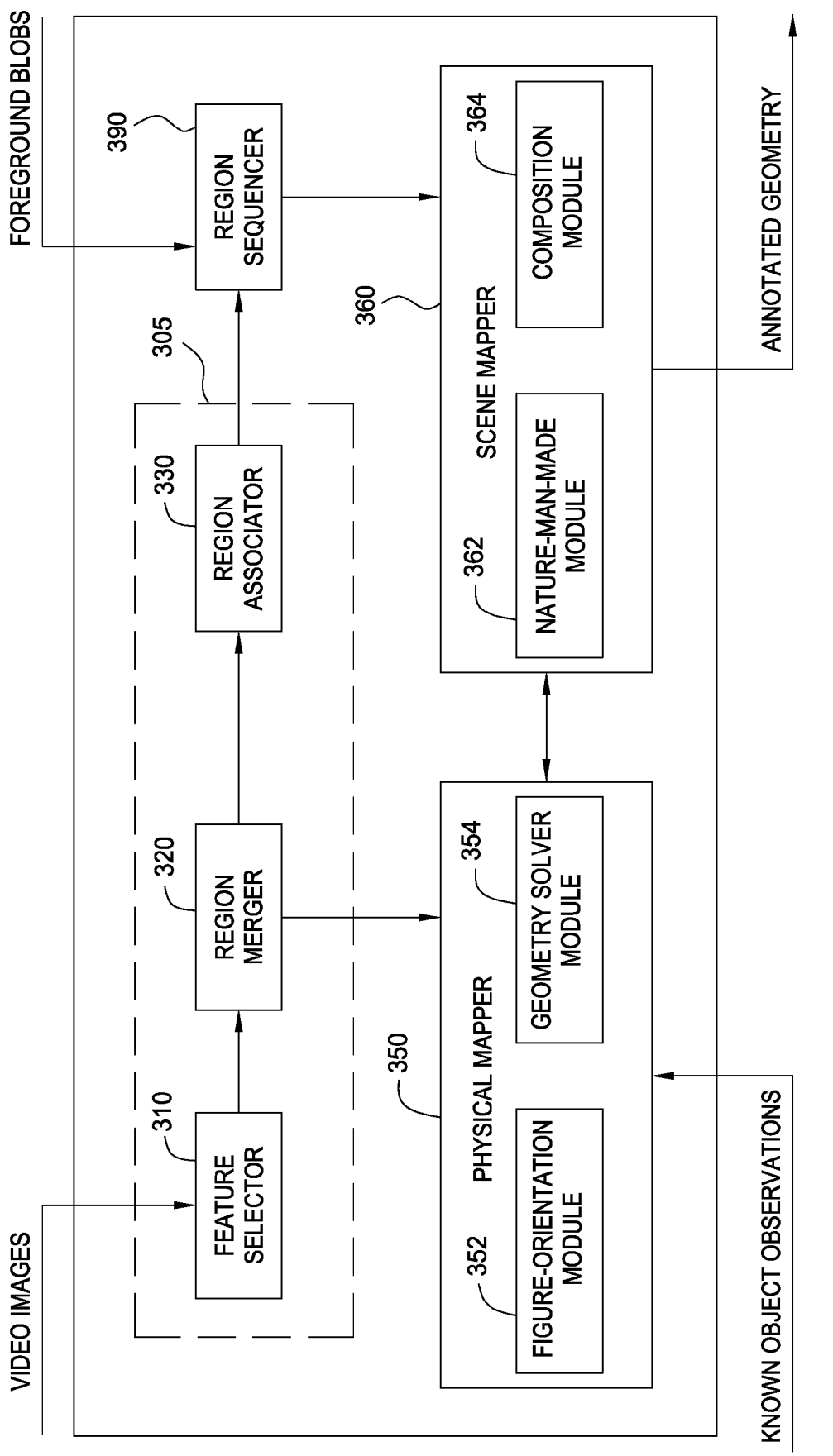
FIG. 3 illustrates a context processor, according to one embodiment of the present invention.

FIG. 3 further illustrates components of a context processor 300, according to one embodiment of the present invention. As shown, the context processor 300 includes a feature selector 310, a region merger component 320, a region associator 330, a region sequencer 340, a scene mapper 350 and a physical mapper 360. The feature selector 310 may identify various features of pixels in the received images (such as color difference, color gradients, albedo ratio, and the like). The feature selector 310 also may divide the received images into one or more regions, where each region is a plurality of pixels having similar properties (i.e., homogeneous regions), thus creating a segmented background image. Neighboring pixels are considered (for example, in pairs) and continuous regions of pixels are identified. Levels of similarity required for two pixels to form one region vary between different embodiments and may depend on, for example, a desired level of detail of identified objects of the background image. In one embodiment, each identified region is assigned an average of properties/features determined from the pixels in each respective region.

The region merger component 320 identifies may merge connected pixels based on the statistical properties identified by the feature selector 310. That is, the region merger component 320 may associate/merge regions containing statistically similar pixels to re-define the segmented images. In one embodiment, the region merger component 320 provides its results to each of the physical mapper 350 and the region associator 330.

The region associator 330 receives a segmented image, either in a form provided directly by the feature selector 310, or after the region merger component 320 associated/merged related regions. Similar to the region merger component 320, the region associator 320 associates/merges regions containing pixels of similar properties/features, thus creating a new segmented image. However, unlike the region merger component 320, the region associator 330 may evaluate and associate/merge disconnected pixels having similar properties. For example, in a scene including a building and a tree oriented in the middle of the building from the view of a video-capturing device (such as a video camera), the region associator component 330 may identify this occlusion and determine that the building regions are related to one another, i.e., the two regions of the building are part of the same physical object depicted within the scene.

In one embodiment, only one of the region merger component 320 and the region associator 330 is employed by and/or included in the context processor 300. For example, depending on a particular environment being observed, regions of the background image are associated/merged only at one level of detail. Alternatively, the region merger component 320 or the region associator 330 may perform functions of the other module.

In one embodiment, the context processor 300 may also include additional components configured to perform a variety of analysis functions using the video input frames. For example, an edge analysis module may be configured to accumulate scene related observations over periods of time (e.g., information regarding foreground blobs) and determining potential boundaries of regions; a pixel edge classification module may be configured to determine whether a region of a background image occludes another region (or is occluded by another region) of the background image; a segmented image selection module may be configured to determine an optimal region selection; and a segment pair border analysis module may be configured to identify ordered regions pairs based on the selected segmented image and pixel edge classifications. For a given pair of regions, the segment ordering module can determine whether one region occludes the other paired regions. The segment ordering module may be implemented as independent module of the context processor 300, or alternatively as a component of the region merger component 320 or the region associator 330.

The region associator 330 and/or the region merger component 320 may provide the resulting new segmented image(s) to the region sequencer 340. The region sequencer 340 may also receive information from other components of the behavior-recognition system about foreground objects in the scene (such as foreground blobs from a foreground object module).

Generally, the region sequencer 340 may be configured to analyze the received segmented image to determine relations between the regions of the segmented image. In one embodiment, the region sequencer 340 may be configured to determine a spatial ordering for the regions in the scene. For example, the region sequencer 340 may provide spatial information to define how close or how far an object in the scene is in relevance to the video capturing device. The region proximity to the video capturing device may be defined using a z-depth order and regions may be assigned tags (i.e., metadata) indicating their z-depth order.

Using information provided by other components of the video analysis system, the region sequencer 340 may also be configured to analyze the appearance of foreground objects in the scene, for example to identify when foreground objects become obscured by other objects of the scene (i.e., when the foreground element moves behind a portion of a background element). In one embodiment, the region sequencer 340 uses these observations to determine positions of background regions relative to one another (e.g., what segments of the background are in front of (or behind) others).

The physical mapper 350 may be configured to receive the segmented images from the region merger component 320 along with a set of known object observations from other components of the behavior-recognition system (such as an estimator-identifier module configured to classify a foreground object as being a person or a car). The known object observations may include a variety of details about a particular object and/or its class, such as position, orientation, velocity, direction, trajectory, size, type, etc. The known object observations may include statistical averages. For example, males in the United States (as of 2002) have an average height of 1.77 meters. Similarly, an individual walking through a scene may have an expected maximum velocity. These, and other, statistical averages may be useful for the physical mapper 350 to estimate physical dimensions of objects in the screen and derive a conversion factor to calculate physical dimensions from pixels used to represent an object within a scene. Illustratively, the physical mapper 360 may include a figure-orientation module 362 and a geometry solver module 364. The physical mapper 360 uses the known object observations and their properties (e.g., aspect ratio) to determine geometry of the scene.

In one embodiment, the physical mapper 360 may determine size and orientation of objects in the scene based on the known object observations and their properties. Further, as stated, a distance scale is created based on this statistical information. The distance scale may provide size, shape and/or orientation in the scene for objects of different classes by associating the objects with the information provided from the region merger component 320. Based on the distance scale, the physical mapper 360 may further determine an orientation of objects in the scene relative to the video capturing device.

The region sequencer 340 and the physical mapper 350 provide results to the scene mapper 360. Generally, the scene mapper 360 combines the results of the other components of the context processor 300. Further, the scene mapper 360 may classify regions of the segmented image as being structural vs. non-structural regions via a composition module 364 and/or nature vs. man-made (artificial) regions via a nature-/man-made module 362. Furthermore, the scene mapper 360 may label regions and/or objects in the scene (e.g., as being a building, a tree, etc.). In one embodiment, the scene mapper 360 provides a machine learning engine trained using a relevant collection of training data.

After processing the received information, the scene mapper 360 provides various data regarding the scene, including an annotated map of scene. The annotated map of the scene may include, e.g., data regarding regions and objects identified within the scene. For example, the scene mapper 360 may provide output data regarding posture, gesture, shape, position, velocity and trajectory, as well as other static and kinematic data regarding possible foreground objects in the regions of the scene.

In one embodiment, the context processor 300, via the described components, may also provide dynamic labeling of background objects and/or foreground objects in the scene (e.g., maintaining proper labeling of background and foreground objects even when such objects appear and disappear from the background or foreground images respectively). Further, if the foreground and/or background objects are partially occluded, information generated by the context processor may assist in merging and splitting objects being tracked. The context processor 300 may also provide region-specific spatial movement probabilities for objects within the scene.

Note, however, FIG. 3 illustrates merely one possible arrangement of the context processor 300. Not all illustrated components are always present and/or needed. Further, various components of the context processor 300 may be implemented into the other components. For example, the feature selector 310, the region merger component 320 and the region associator 330 may be implemented as one segmentator module 305.

Figure 4:
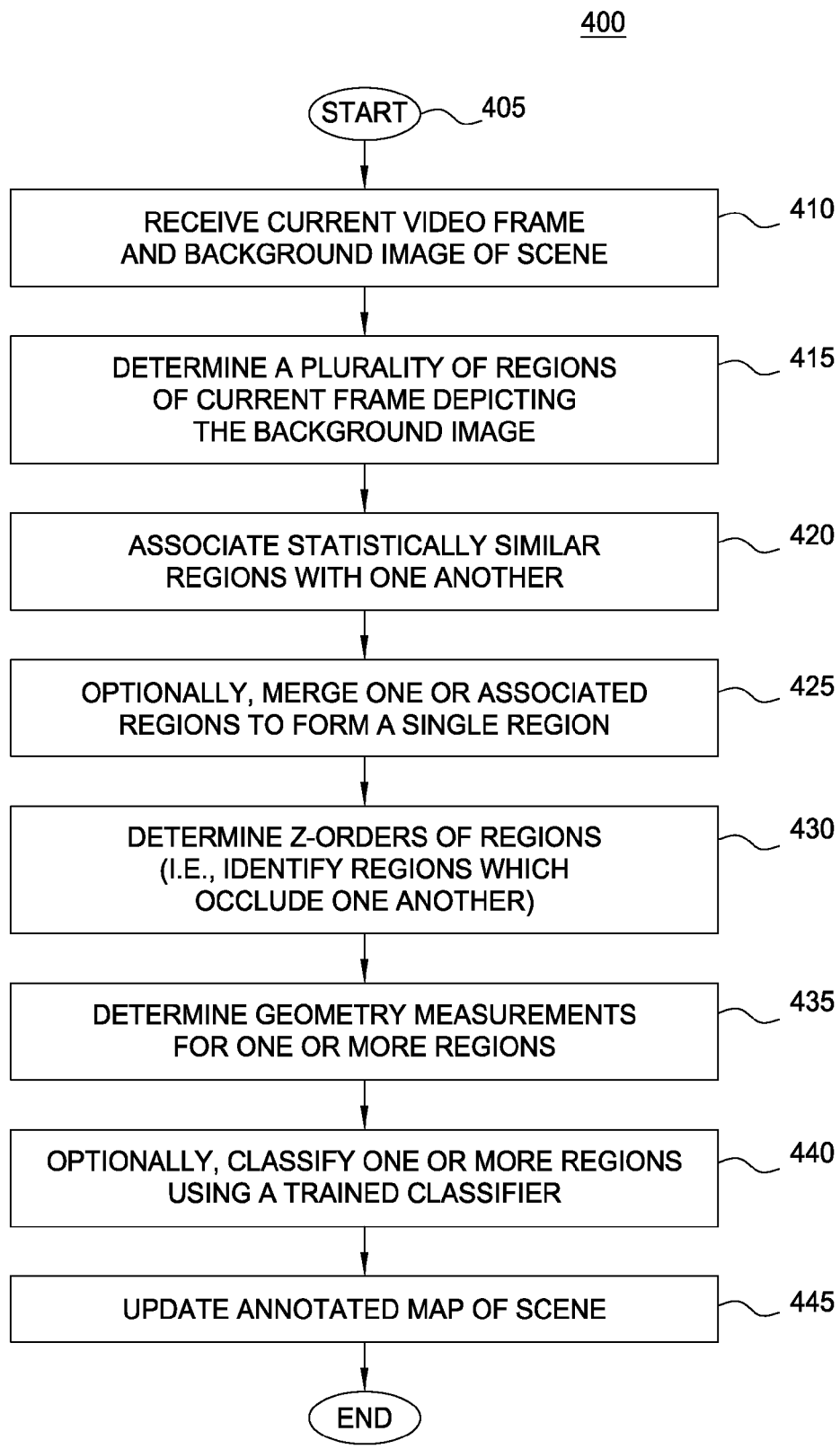
FIG. 4 is a flowchart illustrating a method for mapping a scene depicted by a stream of video frames, according to one embodiment of the present invention.

FIG. 4 illustrates a method for mapping a scene depicted in an acquired stream of video frames. The method starts at step 405. At step 410, a current video frame and a corresponding background image are received. In one embodiment, the background image of the scene image may be generated over a sequence of frames, where the color for a given pixel in the background image is determined as an average of the color value for that pixel over a number of frames. At step 415, a plurality of regions in the background image is determined. Generally, a region is a set of pixels having homogeneous properties, where a pixel may be considered as an elementary region. The regions are formed via an iterative process of combining neighboring pixels that have statistically similar properties.

At step 420, regions which are statistically similar may be associated with one another. For example, the object being in the video frames may depict different portions of the same object. In such a case, the two regions may have similar features (e.g., similar color values for pixels within the region).

At step 425, regions associated with one another may be merged to form a single region. Typically, the parameters used to merge two regions (step 425) provide a greater level of detail in determining statistical similarities than the parameters used to associate regions (step 420). For example, if multiple image regions are obstructed by multiple objects, association of such image regions requires considering many image details. Therefore, in one embodiment, the image regions are associated during the merging step 425, and not during the association step 420. For additional detail regarding one method for associating and merging regions in a sequence of video frames, see "Statistical Region Merging" by Richard Nock and Frank Nielsen, IEEE Transactions of Pattern Analysis and Machine Intelligence, Vol. 26, No. 11, November 2004, hereinafter "Statistical Region Merging," which is incorporated by reference in its entirety.

At step 430, z-depth orders of regions resulting from the previous steps are determined. In one embodiment, such determination is based on occlusions, namely which regions occlude or are occluded by other regions. The resulting regions are considered against each other to determine whether one region occludes another region(s). For example, the regions may be considered in pairs. In one embodiment, if it is determined that one region, region A, occludes another region, region B, then it follows that region B cannot occlude region A. After it is determined that region A occludes region B, region A and B's z-depth orders may be determined as well, namely that region A is closer to a video capturing device than region B. In one embodiment, whether region A occludes region B may be determined using an analysis of foreground objects moving through the scene. For example, if a person walks across the scene, the video frames depicting the individual may occlude some portions of the background image, but not others. Thus, if a foreground object representing the individual is not occluded by region A while moving through the scene, but is occluded by region B, then region A is determined to be behind region B.

It should be noted, that one region may occlude or be occluded by multiple regions. It should be further noted, that some regions are not occluded by and/or do not occlude any other regions. Further, in one embodiment, not every region has a corresponding z-depth order.

At step 435, the geometry of a region may be determined from data generated during the previous steps and known objects observations. Generally, region geometry represents certain characteristics of the region that allow predictions regarding physical and kinematic properties of foreground objects present in that region to be made. Such characteristics include, e.g., position, orientation, velocity, trajectory, size, and the like. For example, known object observations regarding humans include an average size of a person may be used to convert from pixel height (e.g., 30 pixels) to an estimate of height (e.g., 1.77 meters). Thus, combining observations regarding persons in a specific region and known observations about human, average static and/or kinematic data regarding may allow sizes or other geometry or dimensionality of other objects to be estimated. Further, based on the determined information regarding humans in that region, a distance scale for the region may be determined (i.e., a distance from the camera). Such distance scale may later be applied to known object observations of other types of foreground objects to predict properties of the foreground objects in that region. Similar determinations may be made regarding other properties of foreground objects, for example their speed.

At step 440, the regions may be classified as being natural or man-made and/or structural or non-structural. Generally, such classifications are made based on the results of the previous steps and training data. For example, if an observed environment is an outdoor scene, then the system is trained based on multiple outdoor scenes with proper labels assigned to various regions of the scenes. In one embodiment, during the training process, features (e.g., sky may be blue, gray, and so on) and contextual information (e.g., sky is typically at the top of the frame, not at the bottom) associated with certain kinds of objects are collected. Using such data, objects of the background images are determined and labeled.

At step 450, an annotated map of the scene depicted in the video frame reflecting information generated and/or acquired during the previous steps is provided to other components of the video-analysis system. The behavior-recognition system may use the annotated map to learn and analyze patterns of behavior of the scene and to identify abnormal behaviors. The method ends at step 445.

It should be noted that it is not necessary to perform all of the above-described steps in the order named. Furthermore, not all of the described steps are necessary for the described method to operate. Which steps should be used, in what order the steps should be performed, and whether some steps should be repeated more often than other steps is determined, based on, for example, needs of a particular user, specific qualities of an observed environment, and so on.

Figure 5:
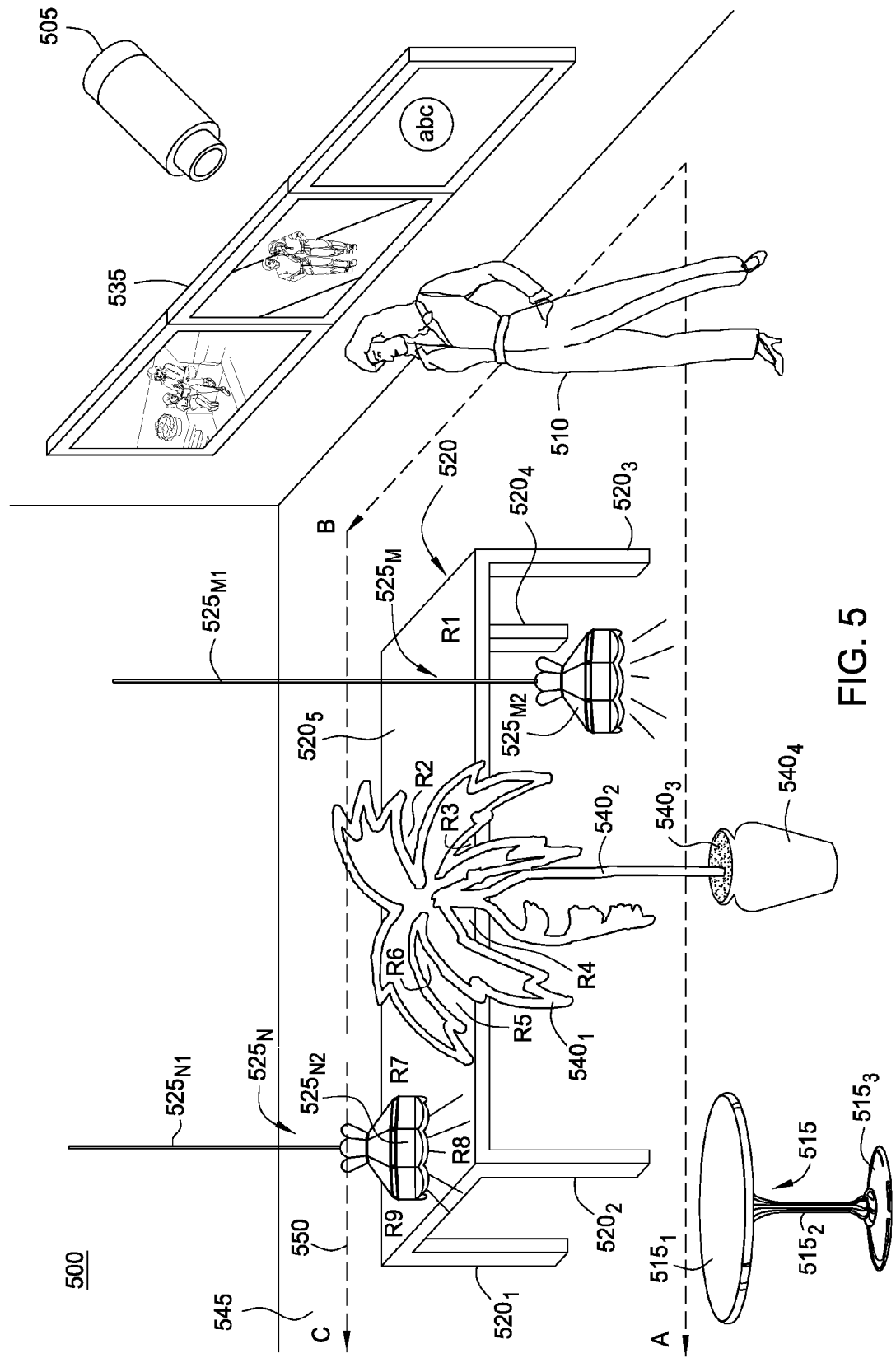
FIG. 5 illustrates an example video frame depicting a scene having identified regions, according to one embodiment of the present invention.

FIG. 5 illustrates a video frame depicting a scene 500 of a bar room. The scene 500 includes a person 510 moving around the bar room where interrupted lines A, B, and C indicate some of the possible trajectories of the person 510 moving around the scene 500. The scene also includes a bar table 515, a table 520, lightning fixtures $525_N$ and $525_M$, a side wall 530, flat panel screens 535, a palm tree 540, a floor 545, and a back wall 550. A video camera 505 is stationary positioned on a ceiling of the bar room and continuously captures the scene 500.

In one embodiment, all parts of the scene 500, but the person 510, are identified as a background image of the scene 500 (as the person 510 is absent from the scene 500). The person 510 is identified as a foreground object. To create an annotated map of the scene 500, according to one embodiment, a context processor segments the background image of the scene 500 into plurality of regions, such as a top $515_1$ of the table 515, a flower pot $540_4$ of the palm tree 540, and so on. In one embodiment, if an object is partially occluded by other object(s), and as a result of such occlusion is separated into multiple parts, the multiple parts of the object are identified as separates regions. For example, a top $520_5$ of the table 520 may be identified as plurality of regions $R_1$ through $R_9$.

It should be noted that a segmentation scale of the scene 500 (e.g., a level of detail reflected by the regions) varies between different embodiments. The segmentation scale may depend on, for example, a threshold of similarity between neighboring pixels required for the pixels to be considered forming one region. For example, in one embodiment, pixels representing a table leg $520_1$ may belong to the region R9 because of similar pixel characteristics, such as color (a similarity threshold 1). However, in another embodiment the pixels representing the table leg $520_1$ form an independent region (a similarity threshold 2), because despite pixels' properties being similar, such properties are still not exactly the same. Under the described circumstances, the similarity threshold 1 is lower than the similarity threshold 2. It should be noted that the segmentation scale may be adjusted by tuning parameter(s) of algorithms employed during the segmentation process (for greater detail, see the discussion above and "Statistical Region Merging").

As described above, the context processor may associate regions identified during the segmentation process that are statistically similar to form new regions. For example, in one embodiment the regions R1 and R2 may be identified as statistically similar, and thus associated with each other to form one region containing pixels of one object, namely the table top $520_5$. In another embodiment, the context processor associates regions identified during a segmentation process according to one statistical parameter, and then, re-associates the resulting regions according to a different statistical parameter. In such an embodiment, during the association step, the regions R1 and R2 (R1 and R2 represent parts of one object, table top $520_5$, but separated by another object, lightning fixture $525_M$) are associated to form one new region. In contrast, the regions R6 and R9 (R6 and R9 also represent parts of the table top $520_5$, but separated from the region R2 by multiple objects, such as lighting fixture $525_N$ and the palm tree 540, which includes leafage $540_1$ and a trunk $540_2$) might be considered as independent regions even after the association step. However, such regions may be associated into one region during the re-association step, e.g., the regions R6 and R9 may be associated with the regions R1 and R2 to form one new region. This is possible because the re-association step involves association In one embodiment, the motion of foreground objects is used to determine z-depth orders of identified regions, i.e., the motion of foreground objects is used to determine whether one region is in front of (or behind) another region, relative to one another. For example, if the person 510 walks along path B, when the person passes behind the palm tree 540, the context processor may determine that the palm tree 540 regions are in front of the table top 515 regions, and thus the z-depth orders of the palm tree 540 and the table 520 regions. The foreground objects motions are used by the system to determine z-depth orders of regions that do not occlude or occluded by other regions. For example, the bar table 515 regions are not occluded by any other regions. However, as the person 510 walks along the path A and proceeds to pass behind the bar table 515, the z-depth orders of the bar table top $515_1$ region may be determined in relation to the table 520 regions, specifically that the bar table top $515_1$ region is closer to the camera 505 view than the table 520 regions. Note, that if the bar table 515 regions, namely $515_1$, $515_2$, and $515_3$ were associated/merged as one region 515, then such determination may be made regarding these regions collectively, in other words, regarding one region 515.

Also note that not every region may be assigned a z-depth order. For example, in some circumstances a z-depth order may be undeterminable. Some regions are not occluded by and do not occlude other regions (e.g., flat panel screens 535). Further, there might not be foreground objects moving in the area surrounding this region that could be used to indicate z-depth orders of these regions. Using the above-described example, if the person 505 never approaches or passes the bar table 515 and the person 505 is the only foreground object, no determination regarding the z-depth order of the regions representing the bar table 515 are made. However, absence of activities around such regions may allow a behavior-recognition system to treat these regions as non-important to the activity occurring within the scene.

A z-depth order of a region helps predicting physical properties of the foreground objects present in or around those regions. For example, a foreground object representing a human, such as the person 510, on average appears smaller (e.g., occupies smaller number of pixels in a video frame) when he is far from the camera 505 than when he is close to the camera 505. Determination of a z-depth order of a region also allows predicting kinematic properties of the foreground objects present in or around those regions. For example, when a foreground object (e.g., the person 510) moves with the same speed along parallel paths, where one path is closer to the camera (e.g., path A) and another path is further from the camera (e.g., path C), speed per pixel of such foreground object differs between the paths, being smaller along the furthest path (here, path C).

As discussed above, the context processor may classify regions, such as classing regions as being man-made or natural-made. In FIG. 5, the leafy region $540_1$ and the trunk region $540_2$ may be identified as natural-made, while, for example, the bar table regions $515_1$-$515_3$ may be classified as man-made.

While the foregoing is directed to embodiments of the present invention, other and further embodiments of the invention may be devised without departing from the basic scope thereof, and the scope thereof is determined by the claims that follow.

What is claimed is:

1. A method for mapping a scene depicted in a sequence of video frames, the method comprising:
   generating, from the sequence of video frames, a background image representing static elements in the scene;
   receiving a current video frame;
   identifying a plurality of regions of the current frame depicting the background image;
   analyzing the plurality of regions of the current frame to identify at least a first region of the background image of the scene that occludes at least a portion of a second region of the background image of the scene; and
   updating an annotated map specifying geometry for one or more of the plurality of regions in the background image to indicate that the first region is in front of the second region, relative to a position of a camera capturing the sequence of video frames.

2. The method of claim 1, further comprising:
   identifying at least one foreground object depicted in the current frame, wherein the foreground object is defined by a collection of pixels of the current frame having one or more features different from a corresponding set of pixels in the background image.

3. The method of claim 2, further comprising:
   determining a conversion factor based on a classification of the foreground object and a number of pixels used to depict the foreground object in the current frame; and
   updating the annotated map of the scene to reflect the conversion factor.

4. The method of claim 2, wherein analyzing the plurality of regions of the current frame to identify the first region that occludes at least a portion of the second region comprises determining that at least a portion of the first region occludes the foreground object and that at least a portion of the second region is not occluded by the foreground object.

5. The method of claim 1, further comprising:
   prior to analyzing the plurality of regions of the current frame, identifying two or more regions of the plurality sharing a set of features; and
   merging the two or more identified regions.

6. The method of claim 1, further comprising:
   determining at least one physical characteristic of at least one of the regions; and updating the annotated map of the scene based on the determined at least one physical characteristic of the at least one region, wherein the at least one physical characteristic is one of position, orientation, velocity, direction, trajectory, size, shape, class, and distance scale.

7. The method of claim 1, further comprising:
   classifying at least one of the plurality of regions using a trained classifier, wherein the at least one region is classified as one of natural-made, man-made, structure, and non-structure; and
   updating the annotated map of the scene to reflect the classification of the at least one region the re-defined segmented image.

8. A computer-readable storage medium containing a program, which, when executed on a processor is configured to perform an operation for mapping a scene depicted in a sequence of video frames, the operation comprising:
   generating, from the sequence of video frames, a background image representing static elements in the scene;
   receiving a current video frame;
   identifying a plurality of regions of the current frame depicting the background image;
   analyzing the plurality of regions of the current frame to identify at least a first region of the background image of the scene that occludes at least a portion of a second region of the background image of the scene; and
   updating an annotated map specifying geometry for one or more plurality of regions in the background image to indicate that the first region is in front of the second region, relative to a position of a camera capturing the sequence of video frames.

9. The computer-readable storage medium of claim 8, wherein the operation further comprises:
   identifying at least one foreground object depicted in the current frame, wherein the foreground object is defined by a collection of pixels of the current frame having one or more features different from a corresponding set of pixels in the background image.

10. The computer-readable storage medium of claim 9, wherein the operation further comprises:
    determining a conversion factor based on a classification of the foreground object and a number of pixels used to depict the foreground object in the current frame; and
    updating the annotated map of the scene to reflect the conversion factor.

11. The computer-readable storage medium of claim 9, wherein analyzing the plurality of regions of the current frame to identify the first region that occludes at least a portion of the second region comprises determining that at least a portion of the first region occludes the foreground object and that at least a portion of the second region is not occluded by the foreground object.

12. The computer-readable storage medium of claim 8, wherein the operation further comprises:
   prior to analyzing the plurality of regions of the current frame, identifying two or more regions of the plurality sharing a set of features; and
   merging the two or more identified regions.

13. The computer-readable storage medium of claim 8, wherein the operation further comprises:
   determining at least one physical characteristic of at least one of the regions; and updating the annotated map of the scene based on the determined at least one physical characteristic of the at least one region, wherein the at least one physical characteristic is one of position, orientation, velocity, direction, trajectory, size, shape, class, and distance scale.

14. The computer-readable storage medium of claim 8, wherein the operation further comprises:
   classifying at least one of the plurality of regions using a trained classifier, wherein the at least one region is classified as one of natural-made, man-made, structure, and non-structure; and
   updating the annotated map of the scene to reflect the classification of the at least one region the re-defined segmented image.

15. The computer-readable storage medium of claim 8, wherein each of the sequence of video frames provides a two-dimensional array of pixel values.

16. The computer-readable storage medium of claim 15, wherein each region is defined by a collection of pixels of the current frame.

17. The computer-readable storage medium of claim 8, wherein the background image comprises a two-dimensional array of pixel values.

18. A system comprising,
   a processor; and
   a memory containing a context processor application, which when executed by the processor is configured to:
      generate, from the sequence of video frames, a background image representing static elements in the scene,
      receive a current video frame,
      identify a plurality of regions of the current frame depicting the background image,
      analyze the plurality of regions of the current frame to identify at least a first region of the background image of the scene that occludes at least a portion of a second region of the background image of the scene, and
      update an annotated map specifying geometry for one or more of the plurality of regions in the background image to indicate that the first region is in front of the second region, relative to a position of a camera capturing the sequence of video frames.

19. The system of claim 18, wherein the context processor is further configured to:
   identify at least one foreground object depicted in the current frame, wherein the foreground object is defined by a collection of pixels of the current frame having one or more features different from a corresponding set of pixels in the background image.

20. The system of claim 19, wherein the context processor is further configured to:
   determine a conversion factor based on a classification of the foreground object and a number of pixels used to depict the foreground object in the current frame; and
   update the annotated map of the scene to reflect the conversion factor.

21. The system of claim 19, wherein the context processor is configured to analyze the plurality of regions of the current frame to identify first region that occludes at least a portion of the second region by determining that at least a portion of the first region occludes the foreground object and that at least a portion of the second region is not occluded by the foreground object.

22. The system of claim 18, wherein the context processor is further configured to:
   prior to analyzing the plurality of regions of the current frame, identify two or more regions of the plurality sharing a set of features; and
   merge the two or more identified regions.

23. The system of claim 18, wherein the context processor is further configured to:
   determine at least one physical characteristic of at least one of the regions; and
   update the annotated map of the scene based on the determined at least one physical characteristic of the at least one region, wherein the at least one physical characteristic is one of position, orientation, velocity, direction, trajectory, size, shape, class, and distance scale.

24. The system of claim 18, wherein the context processor is further configured to:
   classify at least one of the plurality of regions using a trained classifier, wherein the at least one region is classified as one of natural-made, man-made, structure, and non-structure; and
   update the annotated map of the scene to reflect the classification of the at least one region the re-defined segmented image.

* * * * *